United States Patent
Lee

(10) Patent No.: US 7,744,146 B2
(45) Date of Patent: Jun. 29, 2010

(54) REINFORCEMENT STRUCTURE FOR UPPER PORTION OF VEHICLE DOOR

(75) Inventor: Ikjoong Lee, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 62 days.

(21) Appl. No.: 12/252,672

(22) Filed: Oct. 16, 2008

(65) Prior Publication Data
US 2009/0152893 A1     Jun. 18, 2009

(30) Foreign Application Priority Data
Dec. 14, 2007   (KR) .................. 10-2007-0130866

(51) Int. Cl.
B60J 5/00        (2006.01)
(52) U.S. Cl. .................................. 296/146.6
(58) Field of Classification Search ........... 296/146.6, 296/203.04, 209, 30, 210, 203.02, 146.5, 296/187.12, 203.03, 204; 49/502
See application file for complete search history.

(56) References Cited

U.S. PATENT DOCUMENTS

| | | | | |
|---|---|---|---|---|
| 4,848,033 A | * | 7/1989 | Sasaki et al. ................. 49/352 |
| 4,910,914 A | * | 3/1990 | Asoh ........................... 49/214 |
| 5,086,586 A | * | 2/1992 | Hlavaty et al. ............... 49/211 |
| 5,325,632 A | * | 7/1994 | Djavairian et al. ............ 49/502 |
| 5,544,448 A | * | 8/1996 | Mass ............................ 49/377 |
| 5,865,496 A | * | 2/1999 | Odan et al. ................. 296/146.6 |
| 5,964,063 A | * | 10/1999 | Hisano et al. ................. 49/502 |
| 6,328,359 B1 | * | 12/2001 | Pacella et al. ................ 293/128 |
| 6,668,490 B2 | * | 12/2003 | Hock et al. ................... 49/502 |
| 6,969,107 B2 | * | 11/2005 | Omori et al. ............. 296/146.6 |
| 7,300,097 B2 | * | 11/2007 | Nakagawa ............... 296/146.6 |
| 7,401,847 B2 | * | 7/2008 | Kidachi et al. ......... 296/187.12 |
| 7,530,624 B2 | * | 5/2009 | Endo ....................... 296/146.6 |
| 2005/0001448 A1 | * | 1/2005 | Omori et al. ............. 296/146.7 |
| 2006/0079167 A1 | * | 4/2006 | Krause et al. ................ 454/121 |
| 2006/0168892 A1 | * | 8/2006 | Dohles et al. ................. 49/374 |
| 2009/0026795 A1 | * | 1/2009 | Tate ......................... 296/146.6 |
| 2010/0084888 A1 | * | 4/2010 | Ishitobi et al. ........... 296/146.6 |

FOREIGN PATENT DOCUMENTS

| | | |
|---|---|---|
| JP | 7-81404 A | 3/1995 |
| JP | 8-40071 A | 2/1996 |
| JP | 9-123753 A | 5/1997 |
| JP | 2003-205744 A | 7/2003 |

* cited by examiner

*Primary Examiner*—Kiran B. Patel
(74) *Attorney, Agent, or Firm*—Morgan, Lewis & Bockius LLP

(57) ABSTRACT

Disclosed herein is a reinforcement structure for an upper portion of a vehicle door comprising, an inner panel disposed in a vehicle cabin, an outer panel disposed so as to be spaced apart from the inner panel with a receiving space therebetween, and a reinforcement panel bonded to the inner panel so as to form a closed section space, upper and lower portions of the reinforcement panel being bonded to the inner panel so as to form the closed section space therein.

15 Claims, 4 Drawing Sheets

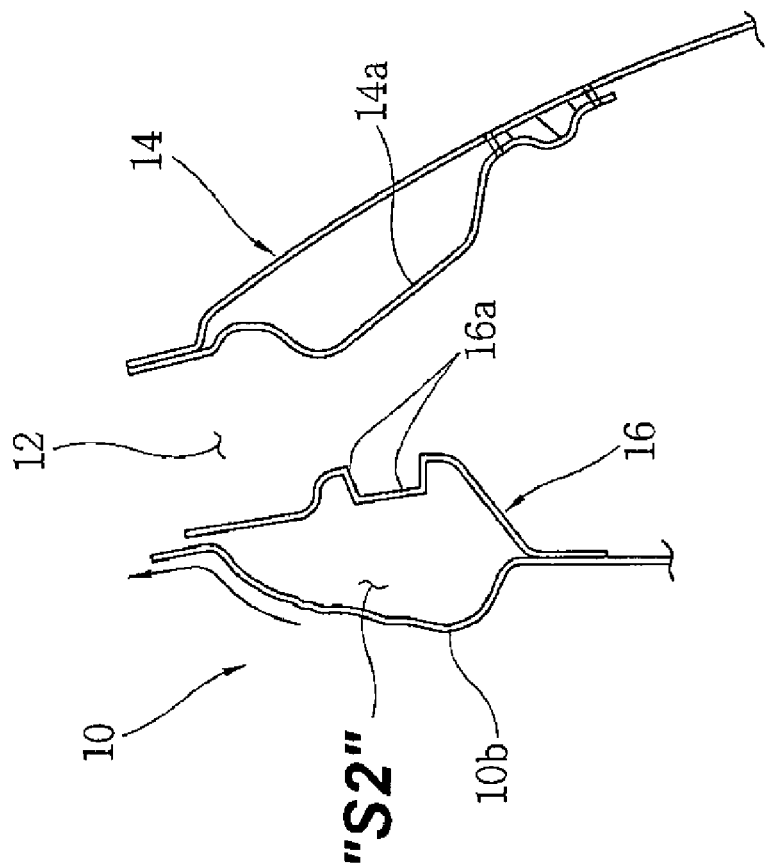

REINFORCEMENT STRUCTURE FOR UPPER PORTION OF VEHICLE DOOR

CROSS-REFERENCE TO RELATED APPLICATIONS

The present application is based on, and claims priority from, Korean Application Serial Number 10-2007-0130866, filed on Dec. 14, 2007, the disclosure of which is hereby incorporated by reference herein in its entirety.

FIELD OF THE INVENTION

The present invention relates to a reinforcement structure for an upper portion of a vehicle door, and more particularly, to a reinforcement structure for an upper portion of a vehicle door that reduces an impact generated between a passenger and an inner panel and resists an impact applied from the outside, thereby ensuring passenger's safety.

BACKGROUND OF THE INVENTION

In general, a door of a vehicle is designed to effectively disperse and absorb load generated during side collision in order to ensure passenger's safety.

In the related art, a technology where a reinforcement panel is bonded to an inner surface of an inner panel or an outer panel to form a frame structure having a closed section space in the door has been used as a reinforcement structure of a door.

Meanwhile, according to a door having the above-mentioned structure, the rigidity of a door may be improved by forming a closed section space therein. However, since upper and lower portions of the closed section space formed between the inner panel and the reinforcement panel are bonded to each other, the deformation of the inner panel is restrained in a vertical direction during side collision. For this reason, there is a problem in that it is not possible to effective absorb an impact.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention help overcome the above-mentioned problem, and ensure passenger's safety as much as possible by dividing a connection portion, which is formed between an upper inner panel and a reinforcement panel of a door, into bonded portions and a non-bonded portion to resist the deformation of the door caused by external load and to allow the connection portion to be easily deformed in a vertical direction by internal load that is caused by collision against the passenger.

According to an embodiment of the present invention, a reinforcement structure for an upper portion of a vehicle door may include an inner panel disposed in a vehicle cabin, an outer panel disposed to be spaced apart from the inner panel with a predetermined distance therebetween, and a reinforcement panel bonded to inner surface of the inner panel, wherein the reinforcement panel and the outer panel form a receiving space, wherein a lower portion of the reinforcement panel being bonded to a lower portion of the inner panel and an upper end of the reinforcement panel being bonded to an upper end of the inner panel to form at least a bonded portion at the upper ends of the reinforcement panel and the inner panel and form a first closed section space between the inner panel and the reinforcement panel, and wherein a lower portion of the reinforcement panel being bonded to a lower portion of the inner panel and an upper end of the reinforcement panel being not bonded to an upper end of the inner panel to form a non-bonded portion at the upper ends of the reinforcement panel and the inner panel and form a second closed section space between the inner panel and the reinforcement panel.

The non-bonded portion may be configured to be a portion where a passenger collides against the inner panel during side collision. The bonded portions and the non-bonded portion may be divided from each other by at least a slit that are formed near a junction of the upper ends of the inner panel and the reinforcement panel and at the upper end of the inner panel. The slit may be formed in a direction perpendicular to a longitudinal direction of the upper end of the inner panel. A filler may be filled at the non-bonded portion between the upper end of the inner panel and the upper end of the reinforcement panel. The inner panel forming the first and second closed section spaces may be provided with a bent surface that protrudes toward a vehicle cabin. The reinforcement panel forming the first and second closed section space may be provided with at least an uneven portion, which is corrugated in a longitudinal direction of the reinforcement panel, along the entire length thereof.

In another exemplary embodiment of the present invention, a reinforcement structure for an upper portion of a vehicle door, may comprise an inner panel disposed in a vehicle cabin, an outer panel disposed to be spaced apart from the inner panel with a predetermined distance therebetween, an side outer panel bonded to inner surface of the outer panel, wherein the side outer panel is disposed to be spaced apart from the inner panel with a predetermined distance, and a reinforcement panel bonded to inner surface of the inner panel, wherein the reinforcement panel and the side outer panel form a receiving space, wherein a lower portion of the reinforcement panel being bonded to a lower portion of the inner panel and an upper end of the reinforcement panel being bonded to an upper end of the inner panel to form at least a bonded portion at the upper ends of the reinforcement panel and the inner panel and form a first closed section space between the inner panel and the reinforcement panel, and wherein a lower portion of the reinforcement panel being bonded to a lower portion of the inner panel and an upper end of the reinforcement panel being not bonded to an upper end of the inner panel to form a non-bonded portion at the upper ends of the reinforcement panel and the inner panel and form a second closed section space between the inner panel and the reinforcement panel.

The non-bonded portion may be configured to be a portion where a passenger collides against the inner panel during side collision. The bonded portions and the non-bonded portion may be divided from each other by at least a slit that are formed near a junction of the upper ends of the inner panel and the reinforcement panel and at the upper end of the inner panel. The slit may be formed in a direction perpendicular to a longitudinal direction of the upper end of the inner panel. A filler may be filled at the non-bonded portion between the upper end of the inner panel and the upper end of the reinforcement panel. The inner panel forming the first and second closed section spaces may be provided with a bent surface that protrudes toward a vehicle cabin. The reinforcement panel forming the first and second closed section space may be provided with at least an uneven portion, which is corrugated in a longitudinal direction of the reinforcement panel, along the entire length thereof.

BRIEF DESCRIPTION OF THE DRAWINGS

For a better understanding of the nature and objects of the present invention, reference should be made to the following detailed description with the accompanying drawings, in which:

FIG. 4 is a view showing that an inner panel shown in FIG. 3 is deformed during side collision.

DETAILED DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
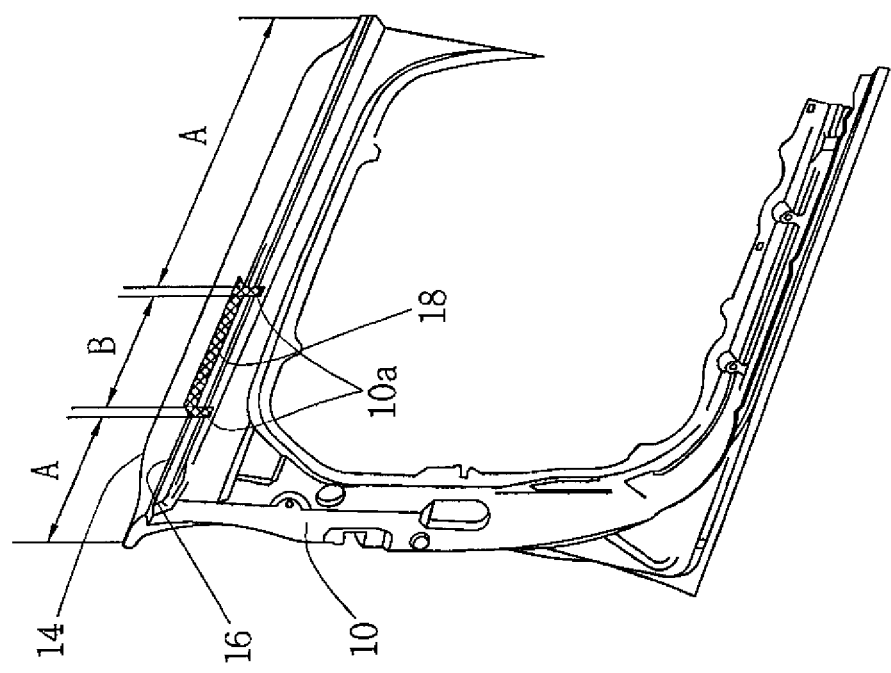
FIG. 1 is a perspective view of a reinforcement structure for an upper portion of a vehicle door according to an embodiment of the present invention.
Figure 2:
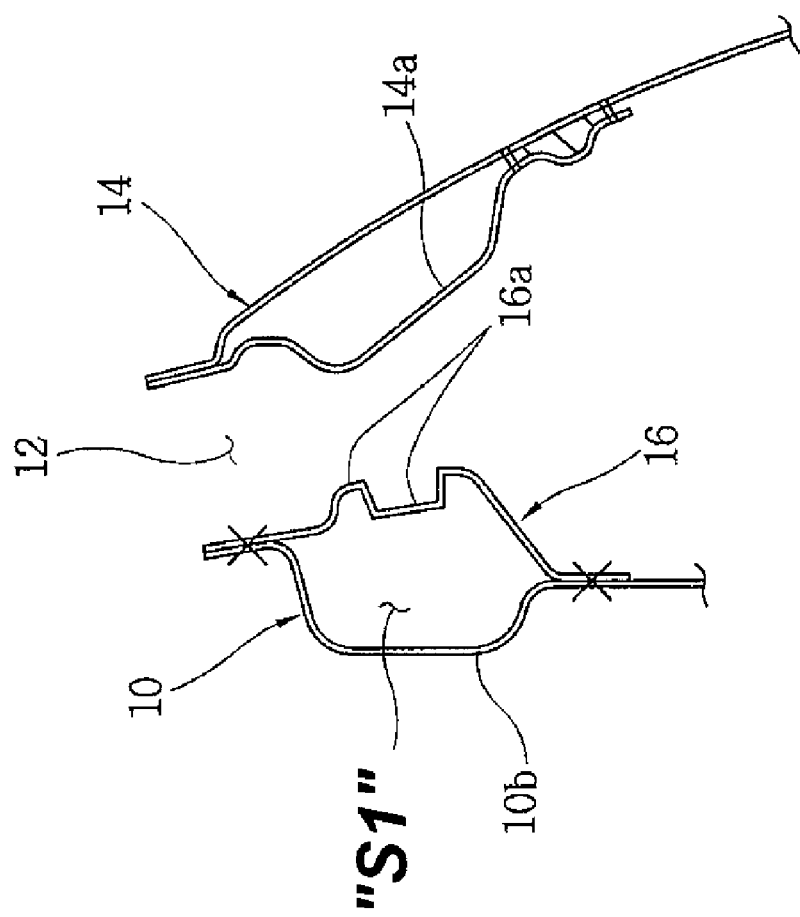
FIG. 2 is a longitudinal cross-sectional view of a bonded portion shown in FIG. 1.
Figure 3:
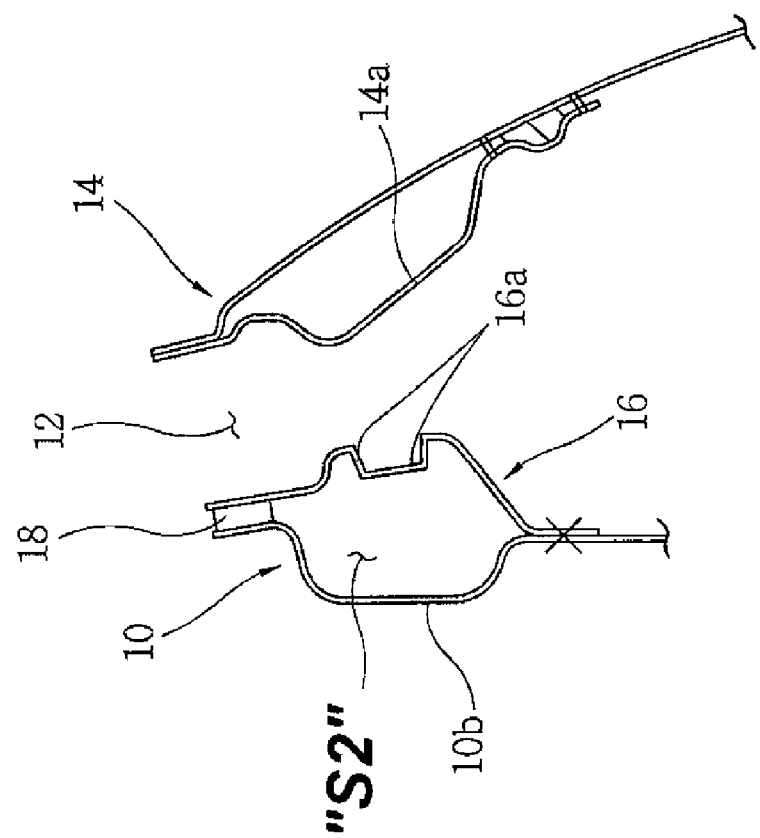
FIG. 3 is a longitudinal cross-sectional view of a non-bonded portion shown in FIG. 1.

As shown in FIGS. 1 to 3, an inner panel 10 forming a door is disposed in a vehicle cabin, and provided with various interior materials. An outer panel 14 is disposed so as to be spaced apart from inner panel 10 with a receiving space 12, in which glass and other part are received, therebetween. The outer panel 14 is reinforced by a side outer panel 14a. Referring to FIG. 2, upper and lower portions of a reinforcement panel 16 disposed between the inner panel 10 and the side outer panel 14a of the outer panel 14 are bonded to inner surface of the inner panel 10 so that a first closed section space S1 having a predetermined volume is formed between the reinforcement panel 16 and the inner panel 10.

Referring to FIG. 1, an upper end of the inner panel 10 and an upper end of the reinforcement panel 16 are formed of bonded portions A where the inner panel 10 and the reinforcement panel 16 are wholly bonded to each other, and a non-bonded portion B where the inner panel 10 and the reinforcement panel 16 are not bonded to each other. Non-bonded portion B is set as a portion where a passenger collides against inner panel 10 during side collision.

Bonded portions A and non-bonded portion B are divided from each other by slits 10a that are formed near junctions of the bonded portions A and the non-bonded portion B at the upper end of inner panel 10 in a vertical direction so as to have a predetermined length.

In an exemplary embodiment of the present invention, FIG. 3 illustrates a non-bonded portion B shown in FIG. 1. A filler 18 is filled at non-bonded portion B between the upper end of the inner panel 10 and the upper end of reinforcement panel 16 in order to maintain airtightness and prevent vibration therebetween. Accordingly, it is possible to minimize the noises, which are caused by vibration between the upper end of inner panel 10 and the upper end of reinforcement panel 16.

A second closed section space S2 is formed by the reinforcement panel 16, the inner panel 10, and the filler 18.

Inner panel 10 forming one surface of the first and second closed section spaces S1 and S2 is provided with a bent surface 10b that protrudes toward a vehicle cabin. Since protruding toward the vehicle cabin, the bent surface 10b provides a space for allowing the inner panel to be sufficiently deformed when the bent surface 10b comes in contact with a passenger's body during the side collision and thus the inner panel 10 is deformed toward the second closed section space S2.

Reinforcement panel 16 forming the other surface of the first and second closed section spaces S1 and S2 is provided with an uneven portion 16a, which is corrugated in a traverse direction, along the entire length thereof. When an impact caused by external load is applied to the vehicle cabin from outside during the side collision, the uneven portion 16a provides the sufficient deformation to improve the rigidity of the reinforcement panel 16 in a bending direction thereof.

Accordingly, due to the impact generated between the passenger and the inner panel 10, the inner panel 10 is deformed in a direction, where the second closed section space S2 is contracted, at the non-bonded portion B during the side collision as shown in FIG. 4. Due to the impact generated in the case, the upper end of the inner panel 10 is deformed to protrude from the upper end of reinforcement panel 16, so that the impact applied to the passenger can be minimized because the impact is converted to deformation energy of the inner panel 10.

That is, since the inner panel 10 is freely deformed at the non-bonded portion B where the inner panel 10 and the reinforcement panel 16 are not bonded to each other, it is possible to reduce the impact applied to the passenger. Accordingly it is possible to maintain an appropriate rigidity at the bonded portions A, similar to an existing door.

In this case, the bent surface 10b which protrudes toward the vehicle cabin so as to be convex, increases the volume of the second closed section space S2 formed between the inner panel 10 and the reinforcement panel 16. Accordingly, the bent surface 10b forms a sufficient space for allowing the inner panel 10 or the reinforcement panel 16 to be deformed during the side collision. As a result, it is possible to maximize the passenger's safety.

Further, the uneven portion 16a, which is corrugated in a traverse direction along the entire length of reinforcement panel 16, further improves the rigidity of the reinforcement panel 16 against the impact that is applied from the outside during the side collision. Therefore, the bending deformation of the door, which is caused by the side collision, is minimized, so that it is possible to improve the passenger's safety.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A reinforcement structure for an upper portion of a vehicle door, the reinforcement structure comprising:

an inner panel disposed in a vehicle cabin;

an outer panel disposed to be spaced apart from the inner panel with a predetermined distance therebetween; and a reinforcement panel bonded to inner surface of the inner panel, wherein the reinforcement panel and the outer panel form a receiving space, wherein a lower portion of the reinforcement panel being bonded to a lower portion of the inner panel and an upper end of the reinforcement panel being bonded to an upper end of the inner panel to form at least a bonded portion at the upper ends of the reinforcement panel and the inner panel and form a first closed section space between the inner panel and the reinforcement panel, and wherein a lower portion of the reinforcement panel being bonded to a lower portion of the inner panel and an upper end of the reinforcement panel being not bonded to an upper end of the inner panel to form a non-bonded portion at the upper ends of the reinforcement panel and the inner panel and form a second closed section space between the inner panel and the reinforcement panel.

2. The reinforcement structure as defined in claim 1, wherein the non-bonded portion is configured to be a portion where a passenger collides against the inner panel during side collision.

3. The reinforcement structure as defined in claim 1, wherein the bonded portions and the non-bonded portion are divided from each other by at least a slit that are formed near a junction of the upper ends of the inner panel and the reinforcement panel and at the upper end of the inner panel.

4. The reinforcement structure as defined in claim 3, wherein the slit is formed in a direction perpendicular to a longitudinal direction of the upper end of the inner panel.

5. The reinforcement structure as defined in claim 1, wherein a filler is filled at the non-bonded portion between the upper end of the inner panel and the upper end of the reinforcement panel.

6. The reinforcement structure as defined in claim 1, wherein the inner panel forming the first and second closed section spaces is provided with a bent surface that protrudes toward a vehicle cabin.

7. The reinforcement structure as defined in claim 6, wherein the reinforcement panel forming the first and second closed section space is provided with at least an uneven portion, which is corrugated in a longitudinal direction of the reinforcement panel, along the entire length thereof.

8. A reinforcement structure for an upper portion of a vehicle door, the reinforcement structure comprising:

an inner panel disposed in a vehicle cabin;

an outer panel disposed to be spaced apart from the inner panel with a predetermined distance therebetween;

an side outer panel bonded to inner surface of the outer panel, wherein the side outer panel is disposed to be spaced apart from the inner panel with a predetermined distance; and a reinforcement panel bonded to inner surface of the inner panel, wherein the reinforcement panel and the side outer panel form a receiving space, wherein a lower portion of the reinforcement panel being bonded to a lower portion of the inner panel and an upper end of the reinforcement panel being bonded to an upper end of the inner panel to form at least a bonded portion at the upper ends of the reinforcement panel and the inner panel and form a first closed section space between the inner panel and the reinforcement panel, and wherein a lower portion of the reinforcement panel being bonded to a lower portion of the inner panel and an upper end of the reinforcement panel being not bonded to an upper end of the inner panel to form a non-bonded portion at the upper ends of the reinforcement panel and the inner panel and form a second closed section space between the inner panel and the reinforcement panel.

9. The reinforcement structure as defined in claim 8, wherein the non- bonded portion is configured to be a portion where a passenger collides against the inner panel during side collision.

10. The reinforcement structure as defined in claim 8, wherein the bonded portions and the non-bonded portion are divided from each other by at least a slit that are formed near a junction of the upper ends of the inner panel and the reinforcement panel and at the upper end of the inner panel.

11. The reinforcement structure as defined in claim 10, wherein the slit is formed in a direction perpendicular to a longitudinal direction of the upper end of the inner panel.

12. The reinforcement structure as defined in claim 8, wherein a filler is filled at the non-bonded portion between the upper end of the inner panel and the upper end of the reinforcement panel.

13. The reinforcement structure as defined in claim 8, wherein the inner panel forming the first and second closed section spaces is provided with a bent surface that protrudes toward a vehicle cabin.

14. The reinforcement structure as defined in claim 13, wherein the reinforcement panel forming the first and second closed section space is provided with at least an uneven portion, which is corrugated in a longitudinal direction of the reinforcement panel, along the entire length thereof.

15. The reinforcement structure as defined in claim 1, further comprising an side outer panel bonded to inner surface of the outer panel, wherein the side outer panel is disposed to be spaced apart from the inner panel with a predetermined distance.

* * * * *